Figure 2:
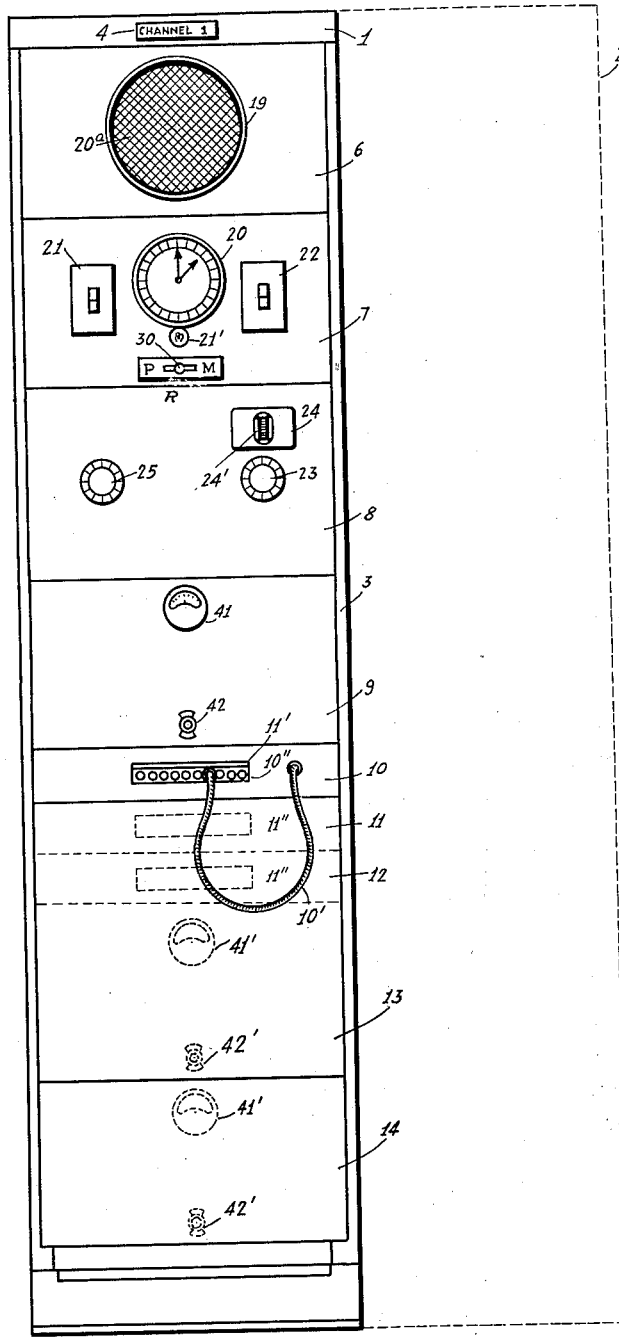

July 31, 1934.  A. F. VAN DYCK  1,968,546
AUDIO FREQUENCY DISTRIBUTION SYSTEM
Filed Oct. 29, 1930   4 Sheets-Sheet 1

Fig. A

INVENTOR
ARTHUR F. VAN DYCK
BY
ATTORNEY

July 31, 1934.  A. F. VAN DYCK  1,968,546
AUDIO FREQUENCY DISTRIBUTION SYSTEM
Filed Oct. 29, 1930  4 Sheets-Sheet 2

INVENTOR
ARTHUR F. VAN DYCK
BY
ATTORNEY

July 31, 1934.  A. F. VAN DYCK  1,968,546
AUDIO FREQUENCY DISTRIBUTION SYSTEM
Filed Oct. 29, 1930  4 Sheets-Sheet 3
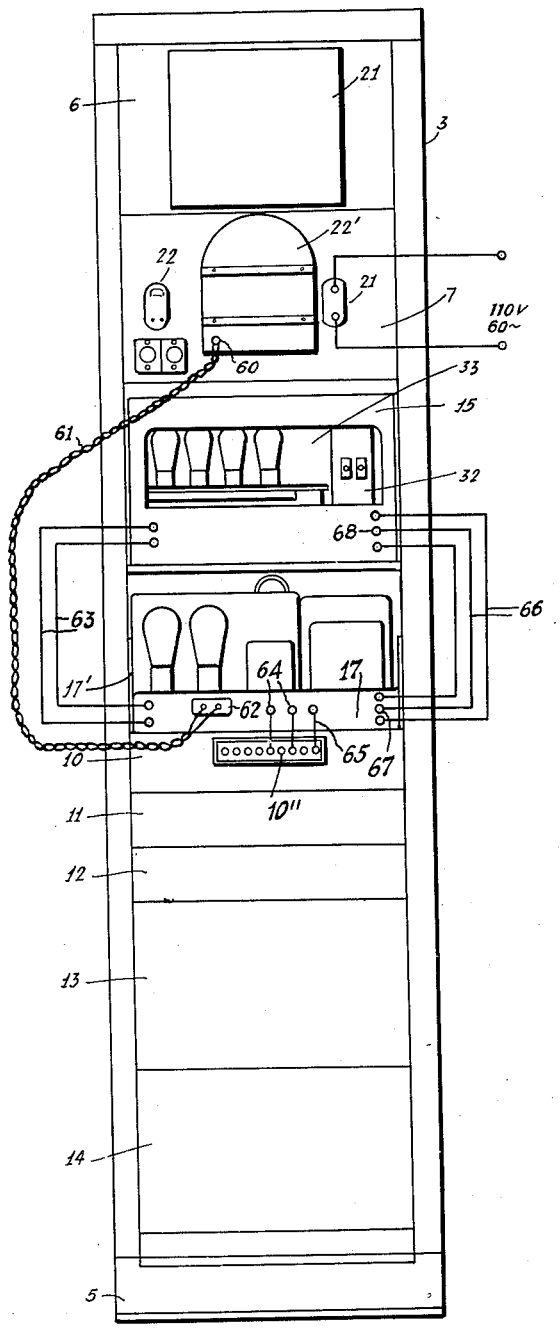
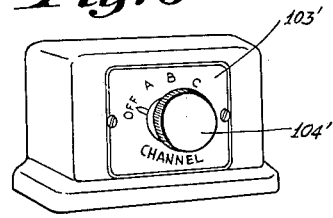
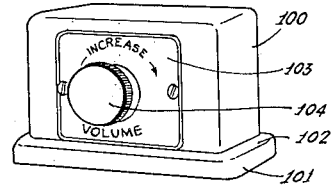
INVENTOR
ARTHUR F. VAN DYCK July 31, 1934.    A. F. VAN DYCK    1,968,546
AUDIO FREQUENCY DISTRIBUTION SYSTEM
Filed Oct. 29, 1930    4 Sheets-Sheet 4
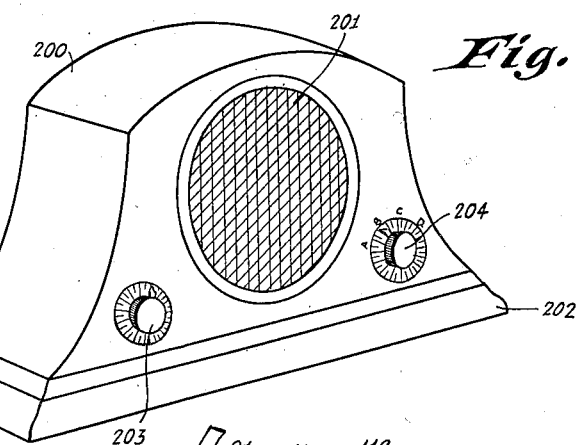
*Fig. 5*
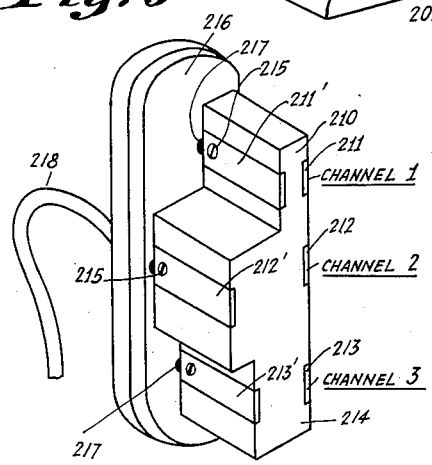
*Fig. 6*
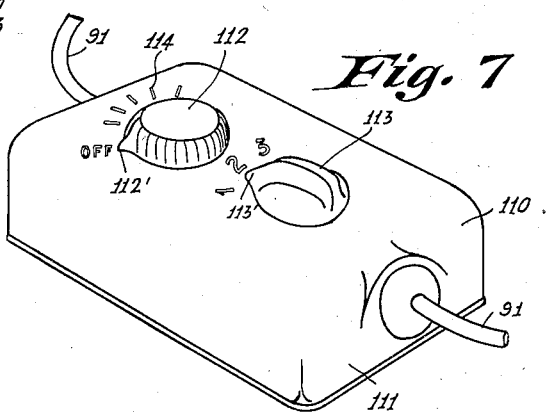
*Fig. 7*
*Fig. 8*
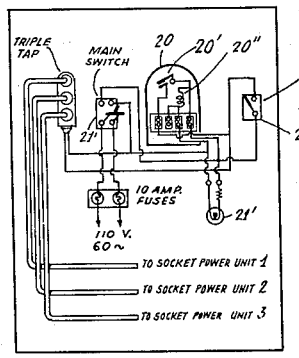
INVENTOR
ARTHUR F. VAN DYCK
BY
ATTORNEY Patented July 31, 1934

1,968,546

UNITED STATES PATENT OFFICE 1,968,546

AUDIO FREQUENCY DISTRIBUTION SYSTEM

Arthur F. Van Dyck, Yonkers, N. Y., assignor to Radio Corporation of America, a corporation of Delaware Application October 29, 1930, Serial No. 491,913

13 Claims. (Cl. 250—20)

Centralized radio has been evolved out of the necessity of accommodating dozens and sometimes hundreds of radio listeners under one roof. In the case of the hotel or hospital, with its transient listeners-in, the problem has been one of supplying radio programs from a central radio receiver, in sufficient variety and range of volume to meet individual needs and tastes. In the case of apartment houses and apartment hotels with their more permanent tenants, the problem has been one of suitable antenna and ground accommodations for the many receiving sets where obviously a jungle of antennæ on the roof, and lead-ins on the walls are both unsightly and inefficient.

For the transient listener-in, it has been necessary to develop some highly specialized equipment in the form of a centrally located radio receiver, an efficient distribution system, and suitable outlets and sound reproducing equipment for each room, apartment or ward. The present audio frequency distribution system must not be confused with the ordinary radio sets designed for use in the home, which sometimes have been pressed into somewhat analogous purposes, such conventional radio receiver and amplifier being connected with scattered loud speakers, or headphones throughout a building, for the parallel ceases with the basic principle.

The present audio frequency distribution system takes the form of the necessary units mounted in standard switch board form, one receiver, with amplifying equipment, distribution and outlet equipment, constituting one channel. A channel is required for the reception and distribution of one program, it being pointed out, however, that more than one complete unit can be employed, and as many as four channels can be installed so that the listener-in may choose any one of four channel programs.

Accordingly, it is one of the main objects of the present invention to provide an audio frequency distribution system so designed that the system can be conveniently extended at any time, extensions for additional loud speakers and head phones being provided for connection to the original load, and additional means being provided whereby when the capacity of the original amplifiers has been reached, additional amplifiers may be installed in uniform manner on the original racks.

Another important object of the present audio frequency distribution system is to provide such a system so arranged as to render the most reliable service with a minimum of attention on the part of the operator, the equipment being operated from the usual electric lighting circuit, a channel installation comprising a receiver, a monitoring loud speaker panel, one or more amplifier units depending upon the distribution system, and a control panel, all mounted on a rack assembly.

Another object of the present invention is to provide a distribution system for an audio frequency radio channel installation, the distribution circuits from each amplifier being separated electrically, so that trouble in one circuit will not affect the others, each distribution circuit leading to a suitable outlet in a predetermined listener's position, such outlets being adapted to take various forms, a power amplifier being provided for each channel with means whereby different volume levels may be obtained by means of different taps, so that as many as 200 loud speakers may be operated on a single amplifier unit, and as many as from two thousand to three thousand head sets.

Still another object of the present invention is to provide an audio frequency distribution system for a plurality of program channels, each distribution channel comprising a plurality of distribution circuits each electrically shielded, and each leading to a suitable outlet, an outlet comprising a reproducer and means for selectively controlling the intensity and program to be reproduced, additional means being provided at the central station whereby a program channel can be automatically rendered operative or inoperative at any predetermined time.

Still other objects of the present invention are to provide a program distribution system especially adapted to the requirements of hotels, hospitals and other institutions with transient guests; and more particularly an audio frequency distribution system permitting the enjoyment of radio or phonograph programs without the bother of individual radio sets, such a system being additionally adapted for use in railroad trains and other similar transportation vehicles.

The novel features which I believe to be characteristic of my invention are set forth in particularity in the appended claims, the invention itself, however, as to both its organization and method of operation will best be understood by reference to the following description taken in connection with the drawings in which I have indicated diagrammatically several organizations whereby my invention may be carried into effect.

Figure 3:
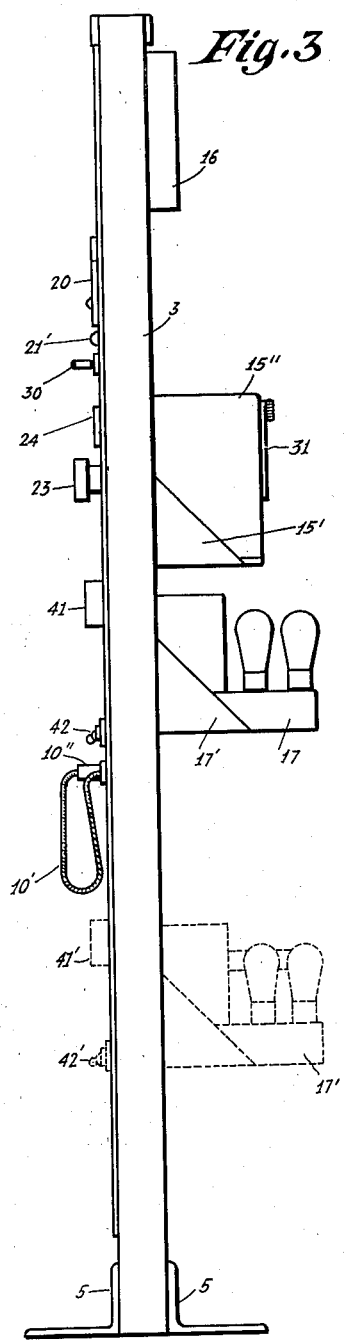

In the drawings,

Fig. 1 is a schematic diagram showing the present audio frequency system including installation connections, Fig. 2 is a front elevation view of a single channel panel for the audio frequency distribution system, Fig. 3 is a side view in elevation of the panel shown in Fig. 2, Fig. 4 is a rear view in elevation of the channel panel shown in Fig. 2, Fig. 5 is an isometric view of a loud speaker adapted for use in the present system, Fig. 6 is a view in isometric of an outlet plug employed in the present system, Fig. 7 is an isometric view of a control plug adapted for utilization for each listener-in, Fig. 8 is a circuit diagram showing circuit connections including the automatic time switch, Fig. 9 is an isometric view of a table type channel selector switch employed in the present system, Fig. 10 is an isometric view of a table type volume control switch employed in the present system.

Referring to the accompanying drawings in which like characters of reference indicate the same parts in the different views, there is shown in Fig. 1 a schematic lay-out wherein there is disclosed a central rack, or racks, and the circuit connections between the central rack, or racks, and different types of distribution outlets. In general, the system comprises three essential groups. The first group includes the members employed at the central point, such members comprising a plurality of electrical instrumentalities and control elements arranged on independent panels supported in a single rack, each rack being provided for a single channel. Thus, in Fig. 1 there is shown in detail a rack 1, adapted for use with "channel 1", and the circuit connections from this rack to different types of distribution outlets. In dotted lines, there is shown a second rack 2 to be employed for an additional channel, an arrow over the second rack designating the direction of growth of the racks for additional channels, if desired.

Referring more particularly to Figs. 2, 3 and 4, it will be seen that each rack consists of a frame 3, made of steel or any other suitable material, the frame usually being close to seven feet in height, and close to two feet in width, a rack being adapted for attachment to a floor by means of elongated angle iron feet 5. Each rack bears at its upper edge a face plate 4 provided with the numerical designation of the channel with which it is to be associated.

Each rack has secured to it a plurality of panel members, each panel preferably being made of some well known type of insulation material, such as a phenol-condensation product, or similar well known insulation material. Each panel is adapted to be secured to the vertical members of the frame 3 by means of bolts 3', or in any other well known manner. As shown in Fig. 2, the topmost panel 6 has attached to it the monitoring loud speaker 19. The exterior opening of the speaker 19 is covered, for the sake of good appearance, with a decorative grille 20a.

In Fig. 4 is shown the casing 21 which houses the reproducer unit, the casing being secured by bolts, or other suitable means, to the rear face of the panel 6. It will be understood that the electric reproducer unit housed within the casing 21 can be of the electromagnetic, electrodynamic or electrostatic types, and that such types are so well known to those skilled in the art that further details need not be given. Immediately below the panel 6 is secured the manual and automatic control panel 7. This panel carries an automatic time switch 20, which switch appears as a clock from its front view.

In Fig. 8, there is shown a circuit diagram of the details of the elements mounted on panel 7, the automatic time switch 20 being conventionally represented, it being pointed out that this switch may be of any well known design. It is believed only necessary to show the switch as including a make and break switch member 20', and an energizing coil 20'' for making or breaking the switch circuit 20' at any predetermined time. As is well known in the automatic time switch art, the clock 20 may be set so as to open or close the channel circuits at a predetermined time, or times.

In circuit with the coil 20'' of the time switch arrangement, there are connected a main switch 21, and a control switch 22. The main switch 21 can be actuated to manually open or close the channel circuits, while the control switch 22 is employed when it is desired to render the automatic time switch 20 inoperative to function. An indicating lamp 21' is connected in circuit with the automatic time switch so as to indicate when the switch 21 has been closed to connect a socket power unit (to be later described in detail) to the 110 volt, 60 cycle source.

As shown in Fig. 8, the various switches on the panel 7 are connected to a tap, shown as a triple tap, the tap including sockets for receiving plugs from the various socket power units employed. Usually, only a single socket power unit is plugged into a tap associated with the control switches, but if additional socket power units are needed, the plug from such one, or more, additional socket power units is inserted into one, or more, sockets on the tap member. One such plug 60 is shown in Fig. 4, the leads 61 from which connect the time switch to a pair of input or supply terminals 62 of the socket power unit 17. Leads 61 supply alternating current to the rectifier of the unit 17 when the clock switch 20' operates. The automatic time switch mechanism is mounted within a casing 22', the casing being secured to the rear face of the panel 7, and as explained heretofore, the only portion of the automatic time switch mechanism to be seen is the clock face 20.

There is, also, provided on the panel 7 a manual switch member 30 which may be moved into any one of three positions. These three positions are for distributing radio programs, phonograph record programs or microphone announcements over the distribution circuits. The letters "P", "R", "M" designate the phonograph, radio and microphone settings respectively.

A panel 8, affixed to the rack frame 3, below the panel 7 has mounted upon its rear face a radio receiver assembly 15, the receiver being affixed to the support 15', which support is rigidly secured to the rear face of panel 8 and the frame sides. The receiver assembly includes a casing 15'', provided with an inspection opening 32 adapted to be covered by a pivotable closure 31.

The receiver tubes and circuits, generally designated by the reference numeral 33, are mounted within the casing 15'. The tubes and circuits 33 generally comprise a plurality of tuned radio frequency stages, a detector stage, and at least one stage of push-pull audio frequency amplification. In Fig. 1, there is shown an antenna A which is adapted for connection to the input circuit of the first stage of the radio receiver, the ground being made, as at G, by securing the ground connection to the frame 3 of the rack. The collecting, radio frequency amplifying, detecting and audio amplifying stages are conventional, and so well known to those skilled in the art that they are not shown in detail.

The station selecting mechanism of receiver 15 comprises the usual condenser gang shaft which is mechanically coupled in any desired manner to a drum 24', a portion of the drum periphery being visible from the outer face of panel 8 through an opening in an escutcheon plate 24, the condenser gang shaft and drum 24' being mechanically coupled in any desired manner to a tuning knob 23, the knob being disposed in alignment with the drum 24'. A second knob 25 is provided in alignment with the tuning knob 23 for controlling the intensity of the received signals. That is to say, the knob 25 constitutes the usual volume control knob. The volume output of the receiver 15 may be controlled in any desired manner, as, for example, by a rheostat connected between the antenna and the grid of the first tube, such control rendering the first stage aperiodic in the well known manner.

A panel 9, positioned below the receiver panel 8, has mounted upon its rear face a combined rectifier and power amplifier assembly 17, also termed a socket power unit ("S. P. U." in abbreviated form). Each unit 17 includes a rectifier arrangement and a second stage of push-pull audio frequency amplification. This equipment can be supplied for 110 volts alternating current, 60 cycles, 40 cycles or 25 cycles. For operation on direct current, a motor generator with automatic starter is supplied and arranged so that the first channel to be cut in starts up the motor generator, and the last one to be cut out shuts it down.

The input of the push-pull stage on panel 9 is connected to the output of the first push-pull audio stage of receiver 15 mounted on panel 8 by a pair of leads 63, as shown in Fig. 4. As shown in Fig. 8, the usual 110 volt lighting current source is connected to an S. P. U., through the main switch 21, automatic time switch 20, and the triple tap member. Thus, the automatic time switch coil 20'' is energized as soon as the switch 21 is closed, thereby closing the switch 20', and permitting the current to flow through a given S. P. U. line at a desired time.

The details of an S. P. U. arrangement are not shown, it being believed sufficient to point out that each unit is conventional in construction, and includes the usual double wave rectifier, means for filtering out hum noises, and a power amplifier including the aforementioned second stage of push-pull amplification. As shown in Fig. 4, lines 66 supply power to the several circuits of the receiver 15 from output terminals 67 of the socket power unit 17 to the power supply terminals 68 of the receiver. The power amplifier is arranged to supply energy to the distribution load at several volume levels, suitable for loud speaker and head phone operation. Such arrangements are conventional in nature, and need not be described in further detail.

Each unit 17 includes a distortion meter 41, and a manual "on-off" switch 42. The purpose of the switch 42 is to disconnect a given socket power unit from the output of the receiver unit 15. The distortion meter 41 indicates to the operator when the power amplifier is being overloaded. The manner of connecting the distortion meter 41 and the "on-off" switch to the power amplifier of the unit 17 is believed obvious, and may be done in any well known manner.

A monitoring and distribution panel 10 is mounted immediately beneath the S. P. U. panel, and has mounted upon its rear face the monitoring and testing jacks, a plug-in lead 10' being provided whereby the latter may be plugged into any one of a plurality of jacks 10'', thereby enabling the operator to observe conditions on the various circuits, and effecting suitable distribution of a power amplifier output to the entire system. It is also useful in locating a defect which might develop on one of the extensions. The jacks 10'' are all mounted upon a common base plate 11', the base plate being affixed to the panel 10 in any well known manner.

It will be understood that by plugging in the lead 10' into any one of the jacks 10'', the central operator is enabled to discover, through the monitoring speaker 19, the conditions existing in any particular distribution circuit. The actual wiring connections, of course, will be such that the plug-in lead 10' is connected to the monitoring speaker 19, while each distribution circuit is connected to the output of the amplifier unit and to a predetermined one of the plurality of jacks 10''.

Below the monitoring speaker and jack panel 10 are mounted two blank panels 11 and 12, which may be replaced at any time by additional monitoring and distribution panels, these replacement additional panels being duplicates of the panel 10 when installed. Thus, there is shown in dotted lines on the panels 11 and 12 the additional jack base plates, and in Fig. 1, the lines from additional S. P. U. jack panels leading to the additional panels 11 and 12. In the same way, there are mounted two additional blank panels 13 and 14 below the blank panel 12, it being understood that these blank panels 13 and 14 may be replaced at any time with additional S. P. U. unit panels, there being shown in dotted lines the distortion meters and switches 41' and 42' respectively as they would appear when the blank panels 13 and 14 are replaced.

These replacements of blank panels 11, 12, 13 and 14 may occur, if it is desired at any time to extend the system and carry a larger load. It will now be appreciated that by providing the switch 42 on each rectifier-amplifier unit panel, it is possible, when using several such units, to disconnect any one of such units from a given distribution area, while permitting another unit to remain connected in circuit with a different distribution area. This is very desirable, particularly where in a given hotel, for example, it would be desired to supply a ballroom with music, while disconnecting another unit of the same channel from an upper floor of the same hotel.

Referring back to Fig. 1, it will be seen that a plurality of distribution circuits are connected to the output of each socket power unit. For the sake of simplicity, in Fig. 1, only a few such circuits are shown. It will, also, be understood that when an additional rack 2 is added to the first rack 1, the panels and their associated instrumentalities described heretofore are duplicated, and that the output from each additional channel is connected to the distribution system now to be described. Considering the first channel, it will be seen that three pairs of circuits lead out from the output of panel 9. Only three pairs of circuits are described in order to preserve simplicity of description. Assume, also, that the circuit $d$ represents the output from the channel 2. It will, then, be appreciated that these distribution circuits $a$, $b$, $c$ and $d$ may be connected to any desired type of outlet.

In order to prevent interaction between the different distribution circuits, all wires for distributing the programs about a building are preferably run in metal conduits "BX" or lead covered conduits, may also be used, if preferred. The metal conduit or covering should be well grounded in all cases in order to procure adequate shielding between the circuits. For most cases, No. 19 rubber and cord insulated twisted wires of the telephone type, will be satisfactory. No two channels should be run in the same conduit, or molding, unless shielded from each other by individual metal covering. As many wires as desired carrying the same channel may be run in the same conduit, or molding. A plurality of additional lines from additional channel S. P. U., jack panels are shown in dotted lines, and designated by the reference character $e$. Similarly, a plurality of additional lines from additional S. P. U., jack panels are shown in dotted lines leading to the first channel, these additional lines being generally designated by the reference character $f$.

The individual installations may take various forms. For example, the circuit $c$ is shown as divided into two branches $c_1$ and $c_2$, both terminating in outlets 70, 71. The outlet 70 may be employed for use with a lead 72 for excitation for a power speaker, while the outlet 71 may be used with a lead 73 having a plurality of head phones 74, in parallel, in its circuit. The circuit $b$ is shown divided into two branches $b_1$ and $b_2$, the former branch terminating in a head phone transformer outlet 74, associated with a step-down transformer 75, the outlet 74 being adapted to receive a lead 76 to which a plurality of headphones 77 are connected in parallel.

The branch circuit $b_2$ terminates in an outlet 78 to which may be connected a lead 79 having connected to it a loud speaker 80. The circuit $a$ is divided into four branches $a_1$, $a_2$, $a_3$, $a_4$. The branch $a_1$ terminates in an outlet 81 to which may be connected a lead 82 having connected in series with it a loud speaker 83 and a volume control device 84. In this branch the volume control 84 is shown independent of the speaker or outlet, and may be used, for example, as a table volume control with extensions connecting it to the speaker and the outlet.

Such a table type of volume control arrangement is shown in Fig. 10, and includes a casing 100 provided with a base 101 having a soft rubber pad 102 attached to its under-surface so as to impart non-slip and non-injurious characteristics to it. Of course, any other type of material may be used to procure similar results. One face of the casing 100 has secured to it a face plate 103 provided with the designations shown on the figure, a manually controllable knob 104 being provided. It is to be understood that the knob 104 is connected to the movable contact element of a rheostat (not shown), which rheostat is connected in series between the outlet 81 and the speaker 83.

The branch $a_2$ terminates in an outlet 85 to which may be connected a lead 86 having connected to it a loud speaker 87, the outlet 85, in this case, having associated with it a volume control arrangement 88. The latter is a rheostat connected between the outlet 85 and the branch $a_2$, it being understood that the volume knob would be mounted upon the wall adjacent the outlet opening, and that the speaker 87 would be mounted at a distance from both the outlet and volume knob. The branch $a_4$ terminates in an outlet 89, to which outlet is, also, connected the branch $d_2$ of the second channel circuit $d$, the latter also branching off into the circuit $d_1$.

A loud speaker 90 is connected by a lead 91 to the outlet 89, the lead 91 being a multi-conductor cord, and accordingly, carrying a plurality of programs to the speaker 90. To control the connection of the speaker 90 to the outlet 89, and also to control the program to be reproduced through the speaker 90 and the volume of the said program, there are provided in series in the lead 91 a channel selector 92 and a volume control device 93. In Fig. 7 there is shown an arrangement embodying two such arrangements.

The composite volume control and channel selector in Fig. 7 comprises a casing 110 having molded curve lines, thereby avoiding sharp corners and dirt-collecting crevices, and a soft rubber pad 111 under the base of the casing, so as to render the latter non-injurious to furniture and non-slippery. The lead 91 is shown connected to both ends of the casing, the casing having mounted on its upper face a volume knob 112 and a channel selector knob 113. Both knobs are provided with pointers 112' and 113' respectively. The index 112' is adapted to cooperate with the raised characters 114, it being noted that when the index 112' is positioned adjacent the character "off", then the speaker is entirely disconnected from the outlet 89, while the remaining characters represent increasing degrees of volume. The raised numerals "1, 2, 3", disposed adjacent the knob 113 designate the different channels which may be selected for reproduction, three being shown in this case. It will be noted that the characters are raised and the knobs are differently shaped, and that this provides for ready manipulation by a blind listener-in.

In Fig. 9 there is shown a modified form of channel selector arrangement of the table type which does not include a volume control device, and which table type channel selector is practically identical in construction with the table type volume control arrangement described in Fig. 10. The selector switch in Fig. 9 differs from the volume control switch of Fig. 10 in that the knob 104' has its index pointer cooperating with designations on the face plate 103' representing different program channels "A, B, C" etc., and also includes a designation for "off".

It will, thus, be seen that in this type of switch a speaker may be connected or disconnected to its associated outlet, but receives programs at a definite volume level, and can be used for selecting any one of the distributed programs. Within the casing there is provided a switch arrangement (not shown) for selectively connecting the speaker to any one of the plurality of channel circuits. The branches $a_3$ and $d_1$ are connected to an outlet 94, to which outlet there may be connected a lead 95 having a speaker 96 connected to it. The outlet 94 has associated with it a channel selector 97 and a volume control 98, it being understood that in this case both the channel selector and volume control switches would be arranged adjacent the outlet on the wall, or in any other place a program could be selected and its volume adjusted by manipulating the knobs adjacent the outlet.

As explained heretofore the output of the power amplifier unit 17 is arranged to supply energy to the load at several volume levels, suitable for loud speaker and headphone operation. For example, there might be three such volume levels, the latter being 300 milliwatts per loud speaker; 150 milliwatts per loud speaker and 50 milliwatts per loud speaker, it being pointed out that wherever multi-channel installations used the last mentioned volume level of 50 milliwatts per loud speaker a volume control switch could be omitted. As shown in Fig. 4 such connections may be made by leads 65 which connect suitable audio output terminals 64 of the power amplifier with certain of the jack terminals 10″. In Fig. 5, there is shown a reproducer adapted for use in an individual installation, the casing 200 being shaped in the form of a clock, casing, the reproducer diaphragm being mounted within the casing and having its opening adjacent the decorative grille 201. The base 202 of the casing 200 may be made of a resilient material, such as a rubber pad, in order to prevent slippage of the casing when placed on furniture, and also to safeguard the surface of the furniture.

A pair of control knobs 203 and 204 are provided on the grille face of the speaker, the knob 203 being adapted to control the intensity of the reproduced audio frequency impulses, while the knob 204 is used for channel selection. Of course, either of these knobs may have an "off" setting. Again, instead of having the casing 200 adapted to be disposed on any piece of furniture, the casing may be arranged for mounting flush in the wall of a room, in such case the grille face of the casing being the only portion visible when the speaker is mounted in the wall.

In Fig. 6 there is shown, in isometric, an arrangement for an outlet plug, to insure relatively simple connection of at least three channels to an extension unit, such as a loud speaker. The outlet plug comprises a T-shaped member 210 having metallic strips 211, 212 and 213, each of the strips representing a different program channel, disposed in spaced relation on its longest face 214. Each strip has a corresponding strip 211′, 212′ and 213′ arranged in parallel spaced relation, as shown in Fig. 6. Each pair of parallel strips are connected by a connector bolt 215, the aforementioned arrangement thereby comprising a triple jack-socket for receiving an outlet plug 216 provided with three jacks 217, each of the jacks being adapted to make contact with its associated channel strip. The outlet plug is connected by means of a lead 218 to any desired extension unit, such as a loud speaker or headphones, in a manner as shown in Fig. 1.

It is believed that the operation of the present system is apparent from the drawings and the aforementioned detailed description. The present system is not only adapted for apartment houses, hotels and hospitals, but may be employed in any location where the user is of a more transient type with a more irresponsible attitude toward the equipment placed at his disposal during his brief sojourn. Such locations may be mobile transportation media, such as railroad trains, steamships, motor buses, aircraft and the like.

With respect to the selection of channels by the consumer, it is pointed out that while channel selection switches have been shown, the consumer may switch from one channel to the other by the simple process of removing a telephone plug from one jack and inserting it into another.

Automatic switches of the dial type may be employed where the building to be equipped is large, and the cost of long conductors begins to eclipse other expenses. Again, a progressive switch mechanism may be used for channel selection, the arrangement involving means whereby the pushing of a button causes the extension to be transferred to the next program of a pre-arranged series. Thus, as the consumer is listening to program No. 1 and desires to change over to program No. 4, a button is pushed three times passing through programs Nos. 2, and 3, of which momentary fragments may be heard. The intermediate sounds are no more objectionable than what is obtained when a radio set is tuned directly.

In order to avoid the constant attendance of an operator at the central station, it may be desirable to employ an automatic time switch which performs functions in addition to those already specified. Thus, programs can be made available in accordance with the pre-arranged schedule of the broadcasting stations, assuming that the reception from nearby high-power stations is preferred, and that micrometer tuning is unnecessary. In such a device, the clock 20 on the panel 7 could include an electric clock motor, such as a telechron clock, driving a drum with removable and interchangeable contact segments. By this means, it would be possible to set up a combination for a week in advance, thus keeping in step with the schedules of the broadcasting stations.

Where a limited number of channels is to be employed, (1, 2 or 3) it is proposed to utilize 1, 2 or 3 trunk lines, each consisting of a pair of conductors in metal conduit or metal moulding, running vertically through the building. At each floor level, a switch box should be provided and horizontal branches running from this box on each floor to the various apartments or rooms to be supplied, each branch consisting of the same number of conductors as the vertical trunks and supplying several extensions. Subdivision of these horizontal branches will be effected at each apartment or room to be supplied through a small switch box with a suitable lock. This box will contain a compensating impedance.

Where automatic switching is to be employed, it is advisable to use three conductors all the way from the central station to the consumer, that is, three conductors in the vertical trunks, three in the horizontal branches, and three in each extension. Two of these will be for the audio frequency and the third with ground will provide the circuit for the dial switch or push-button control. This to avoid as far as possible, burdening the radio program with any unnecessary parasitic noise or clicks originating in the control system. Where headphones are to be used exclusively, it is advisable to use a low impedance line from the central station to the extension; no compensating or substituting impedance is necessary when the headphones are not operating.

Where plugs and jacks are employed, they may be so designed that an impedance is substituted in the line when the loud speaker or phone plug is removed. Where automatic switching is employed, the substitute impedances may be located in the central station on the output panel, or when this involves too long vertical lines, they may be placed at the vertical trunks on each floor.

In installations where the volume control is to be placed on the cord, it should be located as near as possible to the speaker itself. In the case of hospital equipment, it is advisable to unite the volume control and a delicate separable connector, and to anchor the cord to the head of the bed, leaving enough cord free so that the volume control and separable connector may rest beside the patient's hand. The head phone cord from the separable connector to the phones proper should be short enough to avoid unnecessary slack hanging around loose, for obvious reasons. This cord should be properly impregnated with a suitable compound. It is also advisable to provide some sort of sanitary paper earcaps to fit over the telephone receivers, and possibly something similar in the line of a paper sleeve to cover the headband.

Apartment houses, or hotels, equipped with a private telephone exchange may use that system to notify the radio operator to change over individual extensions from one program to another, thus using only one pair to each extension. For use during intervals when no suitable radio programs are available, an electric phonograph unit may be included in the installation. The control panel is so arranged that it is only necessary to set a small key switch one way to transfer to electric phonograph, or the other way to any other pre-arranged microphone external input.

Again, while I have indicated and described several systems for carrying my invention into effect, it will be apparent to one skilled in the art that my invention is by no means limited to the particular organizations shown and described, but that many modifications in the circuit arrangements, as well as in the apparatus employed, may be made without departing from the scope of my invention as set forth in the appended claims.

What I claim is:

1. In a program distributing system, one, or more, channel racks disposed at a central point, a plurality of program reproducers disposed at a point remote from the central point, each rack including a plurality of independent panels and a radio receiver, socket power amplifier unit and automatic time switch control unit connected to energize said socket power unit mounted on different panels, and means for connecting said reproducers to each amplifier unit.

2. A channel installation, adapted for use in a program distribution system comprising a frame, a plurality of panels mounted on said frame, a socket power amplifier unit mounted on one of the panels, a radio receiver mounted on a different panel, and an automatic time switch mechanism mounted on another panel and arranged to connect or disconnect said socket power unit and said receiver to a power source of predetermined times.

3. A channel installation, for use in an audio frequency distributing system, comprising a frame, a plurality of panels mounted on said frame, a radio receiver unit mounted on one of the panels, a combined rectifier and power amplifier unit, adapted for connection to an alternating current power source and said receiver, mounted on another panel, and a time controlled switching device arranged to selectively connect the rectifier to said source, mounted on another of said panels.

4. A channel installation, for use in an audio frequency distributing system, comprising a frame, a plurality of panels mounted on said frame, a radio receiver unit mounted on one of the panels, a combined rectifier and power amplifier unit, adapted for connection to an alternating current power source and said receiver, mounted on another panel, a time controlled switching device arranged to selectively connect the rectifier to said source, mounted on an independent panel, and a monitoring and distribution unit, provided with means to distribute the power amplifier output to said system, mounted on a separate panel.

5. A program distributing system which comprises a plurality of radio receiver units at a central point, a plurality of reproducers at points at a distance from said central point, a plurality of branch lines arranged to be connected between certain of said receivers and certain of said reproducers, and a time controlled means, connected with each of said receivers, for automatically rendering its associated branch lines operative or inoperative at predetermined times.

6. In combination with a plurality of radio receivers, a distributing circuit for each receiver, a plurality of radio reproducers connected with each distributing circuit, a branch circuit connected between each reproducer and its associated distributing circuit, means, associated with each of the reproducers, whereby the reproducer branch circuit may be selectively connected to any one of said distributing circuits, and an automatic time switch at each receiver for rendering the same operative or inoperative to distribute signals over its circuit at predetermined times.

7. In a program distribution system, a plurality of program distributing channels, a common circuit adapted to transmit the programs from either of said channels, a plurality of branch circuits connected to said common circuit and to said distributing channels, and a switch mechanism connected to a plurality of said branch circuits comprising a casing, a program channel selector mounted in said casing, and a reproduction intensity control mounted in said casing.

8. In a program distribution system, a plurality of program distributing channels, a common circuit adapted to transmit the programs from either of said channels, a plurality of branch circuits connected to said common circuit and to said plurality of channels and a combined reproducer and switch mechanism connected to said branch circuits and comprising a casing, an electrical reproducer unit mounted within said casing, a program channel selector mounted in said casing, and a reproduction intensity control mounted in said casing.

9. In a program distribution system a channel rack disposed at a central station, a plurality of reproducers disposed at spaced points remote from the central station, said rack including a plurality of independent supporting panels, a radio receiver unit consisting of radio frequency amplification and detection stages, a combined rectifier and power amplifier unit and an automatic time switch unit, each of said units being mounted on a different one of said panels, and a plurality of distribution conductors connecting said reproducers and the amplifier unit.

10. In a program distribution system a channel rack disposed at a central station, a plurality of reproducers disposed at spaced points remote from the central station, said rack including a plurality of independent supporting panels, a radio receiver unit consisting of radio frequency amplification and detection stages, a combined rectifier and power amplifier unit and an automatic time switch unit, each of said units being mounted on a different one of said panels, and a plurality of distribution conductors connecting said reproducers and the amplifier unit, said switch unit being connected to control the energization of said amplifier unit, and said latter unit being arranged for connection with the receiver unit to energize the circuits thereof and amplify the detected output therefrom.

11. In a program distribution system a channel rack disposed at a central station, a plurality of reproducers disposed at spaced points remote from the central station, said rack including a plurality of independent supporting panels, a radio receiver unit consisting of radio frequency amplification and detection stages, a combined rectifier and power amplifier unit and an automatic time switch unit, each of said units being mounted on a different one of said panels, and a plurality of distribution conductors connecting said reproducers and the amplifier unit, and a monitoring and distribution unit disposed on an independent panel for effecting suitable distribution of the amplifier unit output to said reproducers.

12. In a program distribution system a channel rack disposed at a central station, a plurality of reproducers disposed at spaced points remote from the central station, said rack including a plurality of independent supporting panels, a radio receiver unit consisting of radio frequency amplification and detection stages, a combined rectifier and power amplifier unit and an automatic time switch unit, each of said units being mounted on a different one of said panels, a plurality of distribution conductors connecting said reproducers and the amplifier unit and means mounted on said amplifier unit panel for permitting disconnection of said amplifier unit from said distribution conductors.

13. In a program distribution system a channel rack disposed at a central station, a plurality of reproducers disposed at spaced points remote from the central station, said rack including a plurality of independent supporting panels, a radio receiver unit consisting of radio frequency amplification and detection stages, a combined rectifier and power amplifier unit and an automatic time switch unit, a monitoring loud speaker unit, each of said units being mounted on a different one of said panels, and a plurality of distribution conductors connecting said reproducers and the amplifier unit, and means for connecting said monitoring unit at will to any of said distribution conductors, said switch unit being connected to control the energization of said amplifier unit, and said latter unit being arranged for connection with the receiver unit to energize the circuits thereof and amplify the detected output therefrom.

ARTHUR F. VAN DYCK.